Figures 1, 2:
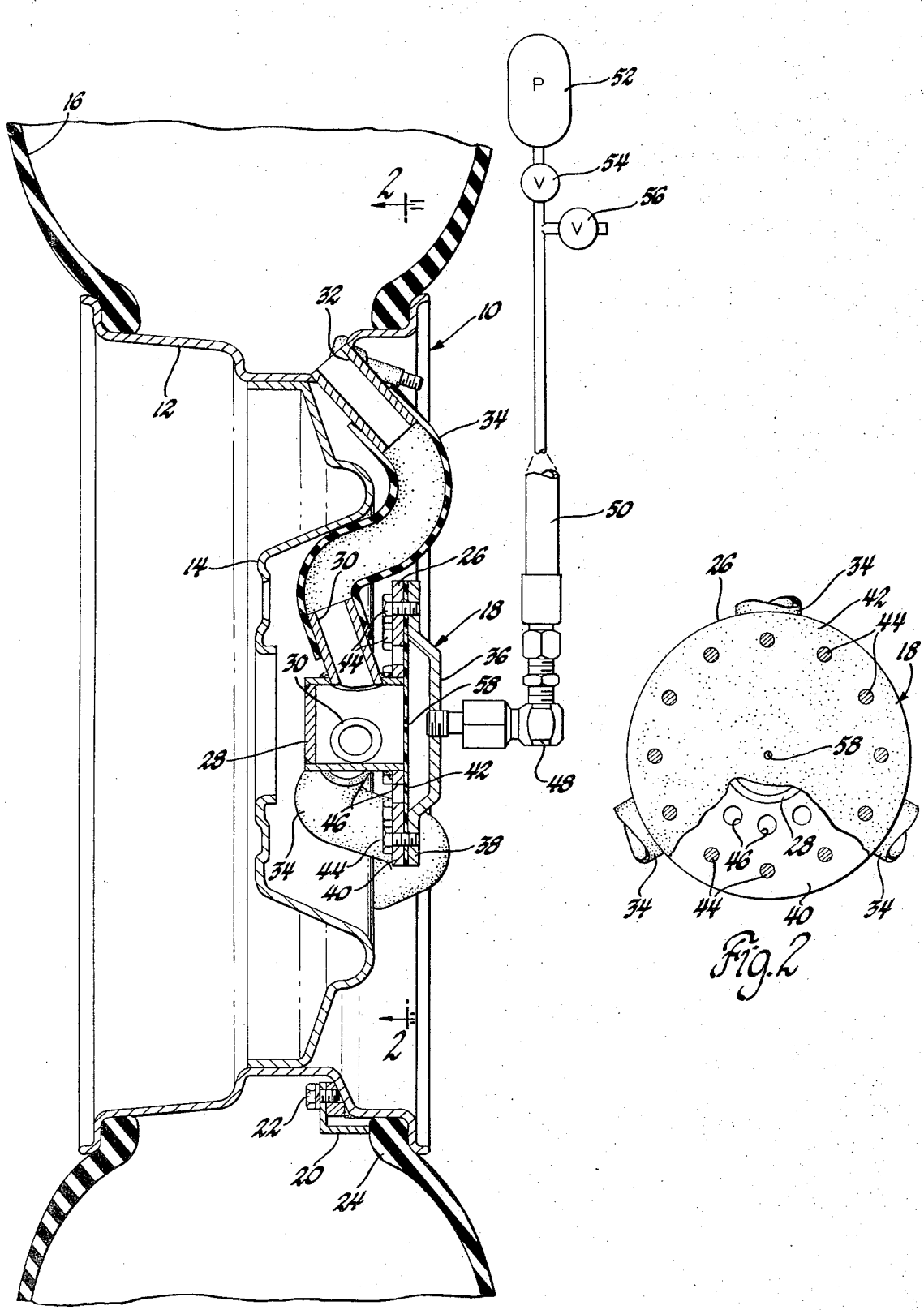

United States Patent [19]
Wolf

[11] 3,838,717
[45] Oct. 1, 1974

[54] TIRE BLOWOUT SIMULATOR
[75] Inventor: Gilbert H. Wolf, Milford, Mich.
[73] Assignee: General Motors Corporation, Detroit, Mich.
[22] Filed: Apr. 4, 1973
[21] Appl. No.: 347,898

[52] U.S. Cl. .................................. 141/65, 152/415
[51] Int. Cl. ............................................ B65b 31/04
[58] Field of Search ............................... 141/1, 4–7, 141/59, 8, 64, 65, 66, 98; 53/84; 85/29, 384, 387; 417/395; 152/415, 416, 417; 251/43; 137/223

[56] References Cited
UNITED STATES PATENTS
| 862,867 | 8/1907 | Eggleston............................. 417/395 |
| 3,532,140 | 10/1970 | Hoffman................................ 141/65 |

Primary Examiner—Houston S. Bell, Jr.
Attorney, Agent, or Firm—Herbert Furman

[57] ABSTRACT

A tire blowout simulator includes a substantially closed housing which is divided into two portions by a flexible diaphragm. One portion of the housing includes a plurality of outlet ports to atmosphere. The diaphragm normally seats over these ports. The one portion communicates with the tire and the other portion normally communicates with a pressure fluid source and may be selectively communicated with atmosphere. A restricted orifice through the diaphragm normally maintains both portions of the housing at substantially equal pressure. This maintains the diaphragm in normal position and inflates the tire. When a blowout is simulated, the other portion of the housing is communicated with atmosphere to displace the diaphragm from over the exhaust ports and deflate the tire. The tire may be reinflated by connecting the other portion of the housing to the pressure fluid source.

3 Claims, 2 Drawing Figures

PATENTED OCT 1 1974

3,838,717

3,838,717

TIRE BLOWOUT SIMULATOR

This invention relates generally to tire blowout simulators and more particularly to simulators of the type wherein a blowout may be simulated and the tire reinflated by selectively and alternately connecting the tire to atmosphere or to a pressure fluid source.

Tire blowout simulators of this type are known and are used for driver training purposes. U.S. Pat. No. 3,532,140 Hoffman, Tire Blowout Simulator for Automotive Vehicles, shows a simulator of this type.

The simulator of this invention differs from known simulators in that it includes a diaphragm for controlling venting of the tire to atmosphere and reinflation of the tire.

In the preferred embodiment of the invention, a lightweight housing is divided by a flexible diaphragm into first and second portions. The diaphragm normally seats over a plurality of outlet ports in the first portion. This portion is communicated with the tire by a plurality of passages which also serve to support the simulator on the wheel without any additional support members being required. The second portion of the housing communicates either with a pressure vessel or with atmosphere across manually operated valves. The vessel may be located in the vehicle and the valves are controlled by the instructor. A restricted orifice through the diaphragm normally maintains the diaphragm seated over the outlet ports and maintains the tire inflated through the restricted orifice. When the instructor wishes to simulate a blowout, he vents the second portion to atmosphere and the resultant unequal pressure in the housing displaces the diaphragm to open the outlet ports and immediately deflate the tire. The tire can be easily reinflated by connecting the second portion of the housing with the pressure vessel. This reseats the diaphragm and inflates the tire through the restricted orifice and the passages communicating the first portion of the housing with the tire.

One feature of this invention is that it provides an improved tire blowout simulator which includes a flexible diaphragm controlling immediate deflation of the tire to simulate a blowout and also reinflation of the tire after the blowout has been simulated. Another feature of this invention is that the diaphragm is mounted within a substantially closed housing and normally closes outlet ports from one portion of the housing to maintain the one portion and the tire at substantially the same pressure as another portion of the housing which may be selectively and alternately communicated with the pressure fluid source or atmosphere. A further feature of this invention is that the diaphragm includes a restricted orifice communicating the housing portions with each other. Yet another feature of this invention is that communication of the other portion of the housing to atmosphere immediately displaces the diaphragm to open the outlet ports and simulate a blowout. Yet a further feature of this invention is that the tire is reinflated by communicating the other portion of the housing with the pressure fluid source so that the pressure fluid seats the diaphragm to close the outlet ports and to reinflate the tire through the restricted orifice.

These and other features of the invention will be readily apparent from the following specification and drawings wherein:

FIG. 1 is a partial sectional view of a vehicle wheel and tire having mounted thereon a tire blowout simulator according to this invention; and FIG. 2 is a view taken generally along the plane indicated by line 2—2 of FIG. 1.

Referring now to the drawings, a conventional vehicle wheel 10 includes a drop center rim 12 and a wheel spider 14. A conventional tubeless tire 16 is conventionally mounted on the rim 12 for inflation and deflation by a tire blowout simulator 18 according to this invention. One or more angle brackets 20 are bolted at 22 to lugs mounted on a flange of the rim 12 to control movement of the adjacent tire bead 24 relative to the rim when the tire is deflated to simulate a blowout.

The simulator 18 generally includes a light-weight housing 26 which is preferably formed of aluminum. The housing 26 includes a first closed end cylindrical housing portion 28 having extending therefrom three equally circumferentially spaced tubes 30 which are likewise of aluminum. The tubes 30 extend angularly to the axis of this housing portion. Likewise, three tubes 32 extend angularly to the axis of the wheel 10 and normal to an angular flange of the rim 12. Tubes 32 communicate through openings in the rim with the inside of the tire 16. Three flexible hoses or passages 34 of rubber or other similar material have their ends telescoped over and secured to respective pairs of tubes 30 and 32 to communicate the housing portion 28 with the interior of the tire 16. The tubes 34 likewise support the simulator 18 on the wheel. Since the simulator is of light-weight construction, no additional supports are necessary.

A second housing portion 36 is of generally dish shape and includes a circular flange 38 which is juxtaposed to a circular flange 40 of the housing portion 28. A flexible circular diaphragm 42 of suitable material is located between the flanges 38 and 40 and is clamped therebetween by a plurality of bolts 44 which extend through circular rows of aligned openings in flange 40 and in the diaphragm and into respective tapped openings in the flange 38. Normally the diaphragm 42 seats over a circular row of cylindrical openings or outlet ports 46 in the flange 40 to close these ports to atmosphere. The ports 46 are located radially inwardly of the bolts 44 and function to deflate the tire 16 through the housing portion 28 as will be further described.

A conventional rotary joint 48 is centrally tapped into the second housing portion 36 and communicates through a conventional passage arrangement 50 with a pressure vessel 52 containing air under pressure. A manual valve 54 controls communication of the passage 50 with the pressure vessel and a manual valve 56 controls communication of the passage 50 with atmosphere. The vessel 52 is located within the vehicle, and the valves 54 and 56 are located so as to be controlled by a driver instructor. The location of the vessel is optional. The location of the valves will depend upon whether the simulator is applied to a front wheel or a rear wheel of the training vehicle.

Normally the valve 54 is open and the valve 56 is closed so that the pressure vessel 52 communicates pressure fluid through the passage 50 to the housing portion 36. A restricted orifice 58 communicates the housing portion 36 with the housing portion 28 so that both housing portions are at substantially equal pressure. The tire is inflated from the housing portion 28 through the tubes 30 and 32 and the passages 34. The rotary joint 48 permits the simulator to rotate with the wheel independently of the passage 50.

When the instructor wishes to simulate a blowout, he closes the valve 54 and opens the valve 56. This immediately communicates the housing portion 36 with atmosphere and the unequal pressure between the housing portions 36 and 28 immediately displaces the diaphragm 42 to the right as viewed in FIG. 1 to open the outlet ports 46 and thereby immediately deflate the tire 16. Thereafter, the instructor may easily reinflate the tire 16 by closing valve 56 and opening valve 54. Although manual valves are disclosed, electrical valves, such as solenoid operated valves, may be likewise used.

Thus, this invention provides an improved tire blowout simulator.

I claim:

1. A tire blowout simulator comprising, in combination, a substantially closed housing having at least one outlet port to ambient atmosphere, a diaphragm traversing the housing and normally seating over the port, first means adapted to communicate the one portion of the housing to one side of the diaphragm with an inflatable and deflatable vehicle tire mounted on a vehicle wheel, said first means providing the sole support of the housing on the vehicle wheel, second means adapted to selectively and alternately communicate the other portion of the housing to the other side of the diaphragm with a source of pressure fluid or with ambient atmosphere, and means providing a restricted orifice through the diaphragm communicating the opposite portions of the housing with each other, communication of the pressure fluid source with the other portion of the housing applying substantially equal pressure on both sides of the diaphragm through the restricted orifice to maintain the diaphragm in normal position and to inflate the tire through the first communicating means, communication of the other portion of the housing with ambient atmosphere venting the other portion of the housing and displacing the diaphragm from the outlet port to deflate the tire through the first communicating means.

2. A tire blowout simulator comprising, in combination, a housing including a pair of housing members having juxtaposed open ends, one member having at least one outlet port to ambient atmosphere, a diaphragm closing the open ends of the housing members and normally seating over the port, first means adapted to communicate one housing member with an inflatable and deflatable vehicle tire, second means adapted to communicate the other housing member selectively and alternately with a source of pressure fluid or with ambient atmosphere, and means providing a restricted orifice through the diaphragm communicating the housing members with each other, communication of the pressure fluid source with the other housing member providing substantially equal pressure in both housing members through the restricted orifice to maintain the diaphragm in normal position and to inflate the tire through the first communicating means, communication of the other housing member with ambient atmosphere providing unequal pressure in the housing members to displace the diaphragm from the outlet port and deflate the tire through the first communicating means.

3. A tire blowout simulator comprising, in combination, a housing including a pair of housing members having juxtaposed open ends provided with juxtaposed flanges, the flange of one member having at least one outlet port to ambient atmosphere, a diaphragm seating on the flanges of the housing members to close the open ends thereof and the outlet port, means securing the flanges and diaphragm to each other to close the housing, first means adapted to communicate the one housing member with an inflatable and deflatable vehicle tire, second means adapted to communicate the other housing member selectively and alternately with a source of pressure fluid or with ambient atmosphere, and means providing a restricted orifice through the diaphragm communicating the housing members with each other, communication of the pressure fluid source with the other housing member providing substantially equal pressure in both housing members through the restricted orifice to maintain the diaphragm in normal seated position over the outlet port and to inflate the tire through the first communicating means, communication of the other housing member with ambient atmosphere providing unequal pressures in both housing members to displace the diaphragm from the outlet port and deflate the tire through the first communicating means.

* * * * *